United States Patent
Warner et al.

(10) Patent No.: US 9,856,381 B2
(45) Date of Patent: Jan. 2, 2018

(54) STRUCTURED ENDOTHERMIC FIRE-RETARDANT AGENTS

(71) Applicant: EMPIRE TECHNOLOGY DEVELOPMENT LLC, Wilmington (DE)

(72) Inventors: John Warner, Wilmington, MA (US); Pui-In Tang, Ypsilanti, MI (US); Amie Stewart, Arlington, MA (US); Colleen Kelly, Brentwood, NH (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/913,239

(22) PCT Filed: Aug. 22, 2013

(86) PCT No.: PCT/US2013/056231
§ 371 (c)(1),
(2) Date: Feb. 19, 2016

(87) PCT Pub. No.: WO2015/026353
PCT Pub. Date: Feb. 26, 2015

(65) Prior Publication Data
US 2016/0200919 A1 Jul. 14, 2016

(51) Int. Cl.
*C08K 9/00* (2006.01)
*C09D 5/18* (2006.01)
*C08L 23/06* (2006.01)
*C09K 21/10* (2006.01)

(52) U.S. Cl.
CPC ............... *C09D 5/18* (2013.01); *C08L 23/06* (2013.01); *C09K 21/10* (2013.01)

(58) Field of Classification Search
CPC ................................ C09D 5/18; C08L 23/06
See application file for complete search history.

(56) References Cited

U.S. PATENT DOCUMENTS

| | | | |
|---|---|---|---|
| 3,968,060 A | 7/1976 | Vincent et al. | |
| 4,871,477 A | 10/1989 | Dimanshteyn | |
| 5,120,345 A | 6/1992 | Kayaert et al. | |
| 6,153,674 A | 11/2000 | Landin | |
| 2001/0008072 A1 | 7/2001 | Kohout | |
| 2001/0049025 A1 | 12/2001 | Kollaja et al. | |
| 2006/0214143 A1 | 9/2006 | Okoshi et al. | |
| 2007/0051271 A1 | 3/2007 | Kruse et al. | |
| 2008/0175919 A1 | 7/2008 | Mohammadi et al. | |
| 2009/0065521 A1 | 3/2009 | Amundson et al. | |
| 2009/0309077 A1 | 12/2009 | Gupta et al. | |
| 2010/0285313 A1 | 11/2010 | Zhang et al. | |
| 2012/0196040 A1 | 8/2012 | Wilk, Jr. et al. | |
| 2012/0231277 A1 | 9/2012 | Roos et al. | |
| 2016/0312121 A1* | 10/2016 | Warner ............... | C08K 5/0066 |

FOREIGN PATENT DOCUMENTS

JP  H02157339 A  6/1990
JP  2003259541 A  9/2003

OTHER PUBLICATIONS

"Brominated flame retardant," Wikipedia, the free encyclopedia, accessed at http://web.archive.org/web/20130511232622/http://en.wikipedia.org/wiki/Brominated_flame_retardant, last modified on Apr. 28, 2013, 4 pages.
"Decabromodiphenyl ether," Wikipedia, the free encyclopedia, accessed at http://web.archive.org/web/20130424112840/http://en.wikipedia.org/wiki/Decabromodiphenyl_ether, last modified on Feb. 26, 2013, 9 pages.
"Flame retardant," Wikipedia, the free encyclopedia, accessed at http://web.archive.org/web/20130614033926/http://en.wikipedia.org/wiki/Flame_retardant, last modified on May 22, 2013, 15 pages.
"Restricted Flame Retardants: Decabromodiphenyl ether (DecaBDE) Services," accessed at http://web.archive.org/web/20111226172656/http://intertek.com/green/decabde/, accessed on Feb. 2, 2016, 1 page.
International Search Report and Written Opinion for International Application No. PCT/US13/56231, dated Jan. 30, 2014, 15 pages.

* cited by examiner

*Primary Examiner* — Hannah Pak
(74) *Attorney, Agent, or Firm* — Maschoff Brennan (57) ABSTRACT

A fire-retardant composition includes a first reagent and a second reagent; the first reagent is isolated from the second reagent; and the first reagent and the second reagent are configured to react with each other endothermically.

20 Claims, 2 Drawing Sheets

STRUCTURED ENDOTHERMIC FIRE-RETARDANT AGENTS

CROSS-REFERENCE TO RELATED APPLICATION

The present application is a U.S. National Stage Application under 35 U.S.C. §371 of International Application No. PCT/US2013/056231, filed on Aug. 22, 2013, the entire contents of which are incorporated herein by reference.

FIELD

The present technology relates generally to flame-retardant compositions, processes of their preparation, and methods of their use.

BACKGROUND

The following description is provided to assist the understanding of the reader. None of the information provided or references cited is admitted to be prior art to the present technology.

Flame-retardant (FR) agents are used to reduce the flammability of several components such as textiles and plastics. Halogenated compounds are the most commonly used class of FR agents. Brominated flame-retardants, such as tetrabromobisphenol-A (TBBPA), hexabromocyclododecane (HBCD) and decabromodiphenyl ether (Deca-BDE) have long been favored for their performance and cost. However, halogenated FR agents have been found to persistent persist in the environment, acting as organic pollutants which may cause adverse health consequences. For example, halogenated FR agents may cause developmental, endocrine, thyroid, reproductive and neurological effects. Indeed, the US Environmental Protection Agency (EPA), and several major manufacturers of flame-retardants have announced that they will progressively phase out deca-BDE in the US by 2013. A safe alternative to brominated FR agents is therefore very much in demand.

There are five currently known mechanisms by which the FR agents act, namely endothermic degradation, dilution of fuel, thermal shielding, dilution of gas phase and gas phase radical quenching. In searching for alternatives to the halogenated FR agents, compounds which would operate as FR agents by using one of these mechanisms are being explored. Recent advances in FR technology for polymeric materials have focused on polyorganosiloxanes, polymer-clay nano-compositions and boron containing compounds. However, there is increased need for improved, environmentally friendly FR agents which meet the regulatory requirements while satisfying the mandatory levels of fire safety performance.

SUMMARY

The present technology provides for flame-retardant or fire-retardant compositions, processes for their preparation, and methods of their use.

In one aspect, a flame-retardant composition is provided, including a first reagent and a second reagent; wherein the first reagent is isolated from the second reagent; and wherein the first reagent and the second reagent are configured to react with each other endothermically.

In another aspect, a flame-retardant composition is provided, wherein the composition includes a polymer matrix and a plurality of microcapsules dispersed in the polymer matrix. Each microcapsule incorporates at least a first reagent and a second reagent, wherein the first reagent is isolated from the second reagent; and the first reagent and the second reagent are configured to react with each other endothermically.

In some embodiments, the first reagent is encapsulated with a first encapsulating material. In some embodiments, the second reagent is encapsulated with a second encapsulating material. In some embodiments, the microcapsule comprises a core which includes a first reagent, encapsulated with a first encapsulating material and a shell which includes a second reagent.

In some embodiments, the first encapsulating material includes a thermally-sensitive material. In other embodiments, the second encapsulating material includes a thermally-sensitive material. In some embodiments, the thermally-sensitive material includes an ethylene-vinyl alcohol co-polymer, neoprene, a chlorinated polyethylene, a chlorosulfonated polyethylene, a polyvinylidene chloride, a polyvinylidene chloride-methyl acrylate co-polymer, or a combination thereof.

In some embodiments, the first encapsulating material and the second encapsulating material are configured to allow the first reagent to contact the second reagent upon heating.

In some embodiments, the polymer matrix includes a thermoset polymer or a thermoplastic polymer. In some embodiments, the polymer matrix includes polyethylene, polypropylene, poly(butylene terephthalate), poly(ethylene terephthalate), acrylonitrile-butadiene-styrene, high impact polystyrene, a rubber latex, silicone, nylon, or a combination thereof. In some embodiments, the polymer matrix includes high impact polystyrene.

In some embodiments, the first reagent includes urea, dimethyl urea, diethylurea, 1,3-dimethyl-1,3-diphenyl urea, 1,1-dimethyl urea, 1,3-dimethyl urea, 1,3-diphenyl urea, 1,3-bis(4-methylphenyl)urea, 1,3-bis(4-methoxyphenyl)urea, or 1,3-bis(4-ethoxyphenyl)urea. The first reagent may also include a mixture of any two or more of the above first reagents. In some embodiments, the second reagent includes ammonium chloride, ammonium hypophosphite, ammonium nitrate, ammonium sulfate, ammonium carbonate, ammonium bromide, or ammonium iodide. The second reagent may also include a mixture of any two or more of the above second reagents.

In some embodiments, the polymer matrix is present in the composition at a concentration of about 5 wt % to about 45 wt %. In some embodiments, the microcapsules have an average particle diameter of about 2 μm and about 10 μm.

In some embodiments, compositions further include at least one filler, at least one additive, or both. In some embodiments, the filler or additive is magnesium oxide, calcium oxide, aluminum oxide, manganese oxide, tin oxide, boehmite, dihydrotalcite, hydrocalumite, aluminum hydroxide, magnesium hydroxide, magnesium oxide, magnesium carbonate, calcium carbonate zirconium oxide, molybdenum oxide, bismuth oxide, talc, organoclay, glass fibers, marble dust, cement dust, feldspar, silica, ammonium bromide, antimony trioxide, antimony trioxide, zinc oxide, zinc borate, barium sulfate, silicones, aluminum silicate, calcium silicate, or titanium oxide. The filler or additive may also include a mixture of any two or more of the above fillers or additives.

In one aspect, a process of making a fire-retardant composition is provided. The process may include coating a first reagent with a first encapsulant to form a first encapsulated reagent; coating a second reagent with a second encapsulant to form a second encapsulated reagent; incorporating the first encapsulated reagent and the second encapsulated reagent into a microcapsule; and dispersing a plurality of microcapsules in a polymer matrix to form the fire-retardant composition.

In some embodiments, the process also includes extruding or molding the fire-retardant composition. In some embodiments, the process also includes cooling the extruded or molded composition.

In one aspect, a method of protecting an article from fire is provided. The method may include exposing an article to a flame or a heat source, wherein the article includes at least a polymer matrix and a plurality of microcapsules dispersed in the polymer matrix. Each microcapsule may include a first reagent encapsulated with a first encapsulating material, and a second reagent encapsulated with a second encapsulating material. Additionally, the first reagent and the second reagent are configured to react with each other endothermically. In some embodiments of the methods, the heat source has a temperature sufficient to breach the first encapsulating material and the second encapsulating material permitting the first reagent to contact the second reagent, and the article exhibits improved fire-resistance, or fire-retardance compared to an article without the first reagent, the second reagent, or both the first reagent and the second reagent.

In some embodiments, the article is coated with the composition. In other embodiments, the article is made from the composition. In some embodiments, the article is an automotive component, an appliance component, a toy, a textile, a carpet, an upholstery, an airplane component, a computer component, or a housing for an electrical device.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The illustrative embodiments described in the detailed description and claims are not meant to be limiting. Other embodiments may be used, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition or process consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention.

As used herein, "about" will be understood by persons of ordinary skill in the art and will vary to some extent depending upon the context in which it is used. The term "about" when used before a numerical designation, e.g., temperature, time, amount, and concentration, including range, indicates approximations which may vary by (+) or (−) 10%, 5% or 1%. If there are uses of the term which are not clear to persons of ordinary skill in the art, given the context in which it is used, "about" will mean up to plus or minus 10% of the particular term.

The term "amide" refers to a —NR—(C=O)— group, where R can be hydrogen or alkyl.

The term "urea" refers to a functional group of formula —NR(CO)NR—, where R can be hydrogen or alkyl.

As used herein, the term "microcapsule" refers to a unicellular or multicellular, hollow particle, that is a particle having a peripheral wall or shell enclosing or surrounding one or more hollow cavities, spaces or voids within the interior of the particle which, unless otherwise noted, can be evacuated or filled with one or more reagents.

It will be understood by those in the art that the term "fire-retardant" encompasses "flame-retardant." As used herein, the term "fire-retardant," or "flame-retardant," refers to materials that either resist combustion, or if ignited will self-extinguish the flame.

The present technology relates to fire-retardant or flame-retardant compositions. In certain aspects, the present technology relates to fire-retardant polymer compositions. In some embodiments, the present technology relates to structured endothermic fire-retardant agents.

In one aspect, a first fire-retardant composition is provided. The first fire-retardant composition includes a first reagent and a second reagent; wherein the first reagent is isolated from the second reagent; and the first reagent and the second reagent are configured to react with each other endothermically.

In another aspect, a second fire-retardant composition is provided. The second fire-retardant composition includes a polymer matrix and one or more microcapsules dispersed in the polymer matrix. In some embodiments, the composition includes a plurality of microcapsules. Each microcapsule incorporates at least a first reagent and a second reagent, wherein the first reagent is isolated from the second reagent. In some embodiments, the first reagent and the second reagent are configured to react with each other endothermically upon contact with each other.

The first reagent may be isolated from the second reagent by encapsulating both the reagents in encapsulating materials. One reagent can be encapsulated in an encapsulating material to form a core with the other reagent forming the shell, or both the reagents can be separated by a barrier. Thus, in some embodiments, the first reagent is encapsulated with a first encapsulating material. In some embodiments, the second reagent is encapsulated with a second encapsulating material. In some embodiments, the microcapsule comprises a core which includes a first reagent, encapsulated with a first encapsulating material and a shell which includes a second reagent. In other embodiments, the microcapsule comprises a core which includes a second reagent, encapsulated with a second encapsulating material and a shell which includes a first reagent. In yet another embodiment, the microcapsule comprises a first reagent and a second reagent, wherein the first and the second reagent are separated by a barrier layer.

Figure 1:
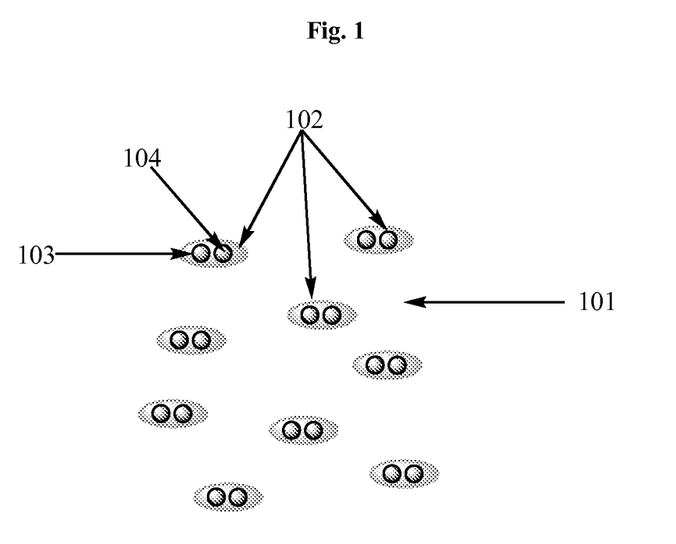
FIG. 1 is a schematic illustration of a composition of the present technology, according to one embodiment.

One embodiment of the composition of the present technology is as shown in FIG. 1. The composition comprises a polymer matrix 101 and a plurality of microcapsules 102 dispersed in the polymer matrix. The microcapsule includes a first reagent 103 and a second reagent 104 which are isolated from each other.

Figure 2A:
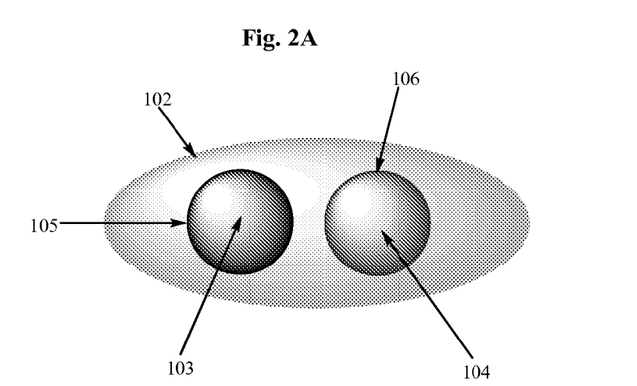
FIGS. 2A, 2B, and 2C illustrate various embodiments of the fire-retardant microcapsule.

One embodiment of the microcapsule is as shown in FIG. 2A. The microcapsule 102 includes a first reagent 103 and a second reagent 104. The first reagent is encapsulated in a first encapsulating material 105, and the second reagent is encapsulated in a second encapsulating material 106.

Figure 2B:
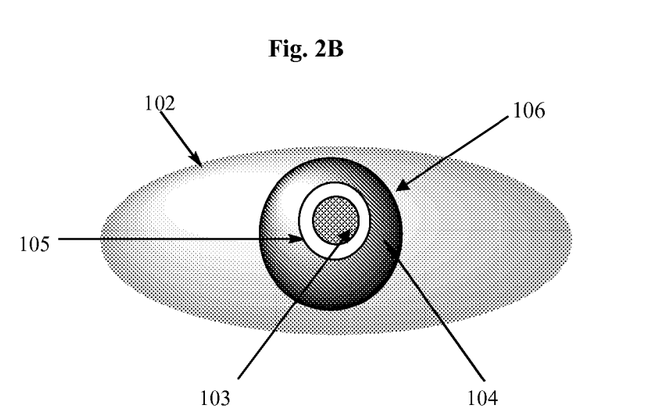

Another embodiment of the microcapsule is as shown in FIG. 2B. The microcapsule 102 includes a first reagent 103 and a second reagent 104. The first reagent is encapsulated in a first encapsulating material 105, and the second reagent is encapsulated in a second encapsulating material 106.

Figure 2C:
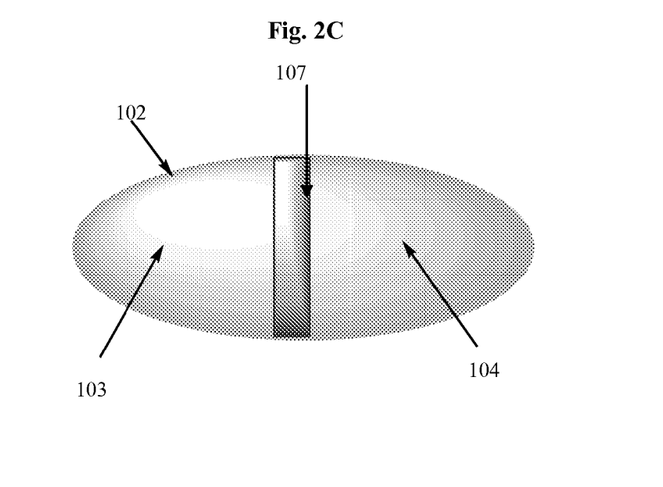

In yet another embodiment of the microcapsule is as shown in FIG. 2C. The microcapsule 102 includes a first reagent 103 and a second reagent 104. The first reagent and the second reagent are separated by a barrier layer 107.

The encapsulating materials and the barrier layer are such that they isolate or prevent contact between the first and the second reagent. In some embodiments, the first encapsulating material and the second encapsulating material are configured to allow the first reagent to contact the second reagent upon heating or upon exposure to a flame or a heat source. Such materials include, for example, thermally-sensitive materials. In some embodiments, the first encapsulating material includes a thermally-sensitive material. In other embodiments, the second encapsulating material includes a thermally-sensitive material. In some embodiments, the barrier layer includes a thermally-sensitive material.

The thermally-sensitive materials are inert to the reagents, but will readily melt, dissolve or disintegrate upon exposure to a heat or flame source. Suitable thermally-sensitive materials include, but are not limited to, ethylene-vinyl alcohol co-polymer, neoprene, chlorinated polyethylene, chlorosulfonated polyethylene, polyvinylidene chloride, polyvinylidene chloride-methyl acrylate co-polymer, or a combination of any two or more thereof.

Suitable first reagents and second reagents are such that they react endothermically upon contact with each other. Compounds which react endothermically are known in the art, for example, those which are used in cold packs. Compounds which undergo endothermic reactions on contact include, for example, ammonium chloride and water, ammonium nitrate and water, potassium chloride and water, sodium acetate and water, sodium thiosulfate and water, barium hydroxide octahydrate crystals and dry ammonium chloride, thionyl chloride ($SOCl_2$) and cobalt(II) sulfate, ethanoic acid and sodium carbonate, urea and water, urea and ammonium chloride, urea and ammonium hypophosphite, 1,3-dimethyl-1,3-diphenyl-urea and ammonium chloride, and the like. Such combination of compounds can be used as a first reagent and a second reagent. On some embodiments, the first reagent may include a combination of compounds, e.g., urea, potassium chloride, potassium nitrate and ammonium chloride and the second reagent may include a compound which reacts endothermically upon contact with all compounds of the first reagent, e.g., water.

In some embodiments, the first reagent includes urea, dimethyl urea, diethylurea, 1,3-dimethyl-1,3-diphenyl urea, 1,1-dimethyl urea, 1,3-dimethyl urea, 1,3-diphenyl urea, 1,3-bis(4-methylphenyl)urea, 1,3-bis(4-methoxyphenyl)urea, 1,3-bis(4-ethoxyphenyl)urea, potassium fluoride dihydrate, potassium chloride, potassium bromide, potassium iodide, potassium nitrite, potassium nitrate, potassium thiosulfate pentahydrate, potassium cyanide, potassium cyanate, potassium thiocyanide, sodium perchlorite, sodium perchlorate, sodium perchlorite dihydrate, sodium bromide dihydrate, sodium nitrite, sodium nitrate, sodium acetate trihydrate, sodium thiosulfate pentahydrate, sodium cyanide dihydrate, sodium cyanate, silver nitrate and rubidium nitrate, or a combination of any two or more thereof. In some embodiments, the second reagent includes water, ammonium hypophosphite, ammonium nitrate, ammonium sulfate, ammonium carbonate, ammonium chloride, ammonium bromide, ammonium iodide, ammonium iodate, ammonium nitrate, ammonium cyanide, ammonium thiocyanide, or a combination of any two or more thereof.

The microcapsules are suitable for inclusion in a wide range of polymer matrices, including thermoplastic polymers, thermoset polymers, elastomeric polymers, and combinations of any two or more thereof. In some embodiments, the polymer matrix included in the compositions is a thermoset polymer or a thermoplastic polymer. Suitable polymers include, but are not limited to, polyethylene, polypropylene, poly(butylene terephthalate), poly(ethylene terephthalate), acrylonitrile-butadiene-styrene, high impact polystyrene, a rubber latex, silicone, nylon, or a combination of any two or more thereof. In some embodiments, the polymer matrix includes high impact polystyrene.

Suitable thermoplastic polymers include, but are not limited to, polyethylene(PE), polypropylene(PP), poly(butylene terephthalate) (PBT), poly(ethylene terephthalate) (PET), acrylonitrile-butadiene-styrene (ABS), polystyrene (PS), high impact polystyrene (HIPS), nylon, polybutadiene, polybutylene, polycarbonate (PC), cellulosic polymers, ethylene-vinyl alcohol, liquid crystal polymer, phenolics, polyacetal, polyacrylates, polyacrylonitrile, polyamide, polyamide-imide, polyarylene ether, polyarylene ether-polyamide blends, polyaryletherketone, polychloroprene, polyester and unsaturated polyester, polyetheretherketone, polyetherimide, polyimide, polyphenylene oxide (PPO), polyphthalamide, polypropylene and polyethylene co-polymers, polystyrene, polyurethane, polyvinylchloride (PVC), and polyvinylidene chloride. Suitable thermoplastic polymers may also include copolymers, and blends of any two or more such polymers. Suitable thermoset polymers include, but are not limited to, allyl resin, epoxy, melamine formaldehyde, phenol-formaldehyde plastic, polyester, polyimide, polyurethane, silicone and silicone rubber. Suitable elastomeric polymers include, but are not limited to, ethylene-vinyl acetate, styrenic block co-polymers, polyolefin blends, and elastomeric alloys.

In some embodiments, the one or more polymer included in the compositions of the present technology is polyethylene, polypropylene, poly(butylene terephthalate) (PBT), poly(ethylene terephthalate) (PET), acrylonitrile-butadiene-styrene (ABS), high impact polystyrene (HIPS), or nylon. In some embodiments, the polymer included in the compositions of the present technology is high impact polystyrene (HIPS). In some embodiments, the polymer is polyethylene.

Various types of polymers and co-polymers can be used in the compositions of the present technology. In some embodiments, the polymer is a blend, a block co-polymer, a graft co-polymer or a random co-polymer. Exemplary blends include, but are not limited to HIPS/PPO, PPO/PS, ABS/PC, PC/PS and the like. In other embodiments, the polymer may include aliphatic side chains which undergo cyclization.

The amount of polymer included in the composition can be varied to achieve the desired level of fire or flame-retardancy. On a weight to weight percent basis, the composition may include one or more polymers in an amount of about 1 wt % to about 99 wt % of the total weight of the composition. In some embodiments, the composition may include one or more polymers in an amount of about 2 wt % to about 80 wt % of the total weight of the composition. In other embodiments, the composition may include one or more polymers in an amount of about 4 wt % to about 50 wt % of the total weight of the composition. In some embodiments, the composition may include one or more polymer in an amount of about 50 wt % to about 95 wt % of the total weight of the composition. In some embodiments, the composition may include one or more polymers in an amount of about 5% to about 45% by weight based on the total composition. In some embodiments, the polymer is present in the composition at a concentration from about 1 wt % to about 99 wt %. Examples of the amount of one or more polymers in total wt % of the composition include about 1 wt %, about 2 wt %, about 5 wt %, about 10 wt %, about 20 wt %, about 30 wt %, about 40 wt %, about 50 wt %, about 60 wt %, about 70 wt %, about 75 wt %, about 80 wt %, about 85 wt %, about 90 wt %, about 95 wt %, about 96 wt %, about 97 wt %, about 98 wt %, about 99 wt %, and ranges between and including any two of these values.

The microcapsules are incorporated in the composition in an effective amount to achieve the desired fire-retardant activity. Examples of the amount of microcapsules in total wt % of the composition include about 1 wt %, about 2 wt %, about 5 wt %, about 10 wt %, about 20 wt %, about 30 wt %, about 40 wt %, about 50 wt %, about 60 wt %, about 70 wt %, about 75 wt %, about 80 wt %, about 85 wt %, about 90 wt %, about 95 wt %, about 96 wt %, about 97 wt %, about 98 wt %, about 99 wt %, and ranges between and including any two of these values.

The amount of first reagent and second reagent incorporated in the microcapsules can be varied depending upon the desired fire-retardant activity. Examples of the amount of one or more first or second reagents in total wt % of the composition include about 0.005 wt %, about 0.001 wt %, about 0.01 wt %, about 0.05 wt %, about 0.1 wt %, about 1 wt %, about 2 wt %, about 3 wt %, about 4 wt %, about 5 wt %, about 6 wt %, about 7 wt %, about 8 wt %, about 10 wt %, about 15 wt %, about 20 wt %, about 25 wt %, about 30 wt %, about 50 wt %, and ranges between and including any two of these values.

The microcapsules can be of any shape which allows for the reagents to be incorporated therein. For example, the microcapsules can be spherical, elliptical, square, rectangular, irregular shaped, single-walled, multi-walled, and the like. The microcapsules can have a size suitable to be readily dispersed in the polymer matrix substrate and allow for effective endothermic reaction between the reagents. The microcapsules have size in the range of about 1 µm to about 5000 µm. In some embodiments, the microcapsules have an average size within the range from about 1 µm to about 5000 µm, from about 1 µm to 1000 µm, from about 1 µm to about 500 µm, from about 1 µm to about 100 µm, from about 1 µm to about 50 µm, and about 1 µm to about 10 µm, and ranges between and including any two of these values. In some embodiments, the microcapsules have an average particle diameter of about 2 µm to about 10 µm. Although, "microcapsules" are mentioned here, the reagents can be included in any form that allows them to be dispersed in an article or a polymer matrix for fire-retardancy purposes. Accordingly, in one embodiment, the reagents can be included in a nanocapsule which has a size less than about 1 µm. In other embodiments, the reagents can be included in a macrocapsule which has a size of greater than about 5000 µm.

In some embodiments, compositions further include at least one filler, at least one additive, or both. Suitable fillers and additives useful in the present compositions will be apparent to one skilled in the art. Examples of the filler or additive include, but are not limited to magnesium oxide, calcium oxide, aluminum oxide, manganese oxide, tin oxide, boehmite, dihydrotalcite, hydrocalumite, huntite, hydromagnesite, aluminum hydroxide, magnesium hydroxide, magnesium oxide, magnesium carbonate, calcium carbonate zirconium oxide, molybdenum oxide, bismuth oxide, talc, organoclay, glass fibers, marble dust, cement dust, feldspar, silica, ammonium bromide, antimony trioxide, antimony trioxide, zinc oxide, zinc borate, barium sulfate, silicones, aluminum silicate, calcium silicate, and titanium oxide. The filler or additive may also include a mixture of any two or more such additives.

The compositions may further include, but are not limited to, paints, sealant, coatings, polymers, and the like. Such compositions include a polypeptide and at least one excipient, i.e., additive for the treatment of a cellulosic material that is known in the art.

Examples of a suitable excipient for the treatment of a cellulosic material include, but are not limited to, an oil, drier, pigment, leveling agent, flatting agent, dispersing agent, flow control agent, ultraviolet (UV) absorber, plasticizer, solvent, stabilizer, antioxidant and a combination thereof. Specific examples of such excipients can be found in Raw Materials Index, published by the National Paint & Coatings Association, 1500 R.I. Avenue, N.W., Washington, D.C. 20005.

Illustrative driers include, but are not limited to, various salts of cobalt, iron, manganese, cobalt, lead, manganese, calcium, zinc, zirconium, bismuth, lithium, aluminum, barium, cerium, vanadium, lanthanum, neodymium, iron, sodium, potassium, or a mixture of any two or more such salts. The driers may include as the salt octoates or naphthenates, in an amount of about 0.005 wt. % to about 0.5 wt. % metal, based on the polypeptide. A description of metal driers, their functions, and methods for using them may be found in Handbook of Coatings Additives, p. 496-506, ed. by L. J. Calbo, Marcel Dekker, New York, N.Y., 1987.

Where the composition includes a pigment, the pigments may be organic or inorganic, including those set forth by the Colour Index, 3d Ed., 2d Rev., 1982, published by the Society of Dyers and Colourists in association with the American Association of Textile Chemists and Colorists. Other examples of suitable pigments include, but are not limited to, titanium dioxide, barytes, clay, calcium carbonate, CI Pigment White 6 (titanium dioxide), CI Pigment Red 101 (red iron oxide), CI Pigment Yellow 42, CI Pigment Blue (copper phthalocyanines); CI Pigment Red 49:1 and CI Pigment Red 57:1. Colorants such as, for example, phthalocyanine blue, molybdate orange, or carbon black, may be added to the formulation.

Where the composition includes a leveling agent, illustrative agents include, but are not limited to, silicones, fluorocarbons, cellulosics, extenders, plasticizers, and mixtures of any two or more such leveling agents. Where the composition includes a flatting agent, illustrative agents include, but are not limited to, synthetic silica, and synthetic silicate.

Where the composition includes a dispersing agent, illustrative agents include, but are not limited to, sodium bis (tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and mixtures of any two or more such dispersing agents.

Where the composition includes a flow control agent, illustrative agents include, but are not limited to, polyaminoamide phosphate, high molecular weight carboxylic acid salts of polyamine amides, and alkylene amine salts of an unsaturated fatty acid. Further examples include, but are not limited to, polysiloxane co-polymers, polyacrylate solution, cellulose esters, hydroxyethyl cellulose, hydroxypropyl cellulose, polyamide wax, polyolefin wax, hydroxypropyl methyl cellulose, polyethylene oxide, and mixtures of any two or more such flow control agents.

Where the composition includes an ultraviolet (UV) absorber, illustrative absorbers include, but are not limited to, substituted benzophenone, substituted benzotriazoles, hindered amines, and hindered benzoates, diethyl-3-acetyl-4-hydroxy-benzyl-phosphonate, 4-dodecyloxy-2-hydroxy benzophenone, resorcinol monobenzoate, and mixtures of any two or more such UV absorbers.

Where the composition includes a plasticizer, illustrative plasticizers include, but are not limited to mono $C_8$-$C_{24}$ fatty acids, $C_8$-$C_{24}$ saturated fatty acids, and phthalate esters such as di-2-ethyl hexyl phthalate (DEHP), diisodecyl phthalate (DIDP), diisononyl phthalate (DINP), benzylbutylphthalate (BBP), and mixtures of any two or more such plasticizers.

Illustrative solvents for use in the compositions include both aqueous and non-aqueous solvent. For example, water and organic solvents may be used. Illustrative organic solvents include, but are not limited to, ethanol, n-propanol, isopropanol, n-butanol, sec-butanol, isobutanol, ethylene glycol, monobutyl ether, propylene glycol n-butyl ether, propylene glycol methyl ether, propylene glycol monopropyl ether, dipropylene glycol methyl ether, diethylene glycol monobutyl ether, methylene chloride (dichloromethane), 1,1,1-trichloroethane (methyl chloroform), 1,1,2-trichloro-1,2,2-trifluoroethane (CFC-113), trichlorofluoromethane (CFC-11), dichlorodifluoromethane (CFC-12), chlorodifluoromethane (HCFC-22), trifluoromethane (HFC-23), 1,2-dichloro-1,1,2,2-tetrafluoroethane (CFC-114), chloropentafluoroethane (CFC-115), 1,1,1-trifluoro 2,2-dichloroethane (HCFC-123), 1,1,1,2-tetrafluoroethane (HCFC-134a), 1,1-dichloro-1-fluoroethane (HCFC-141b), 1-chloro-1,1-difluoroethane (HCFC-142b), 2-chloro-1,1,1,2-tetrafluoroethane (HCFC-124), pentafluoroethane (HFC-125), 1,1,2,2-tetrafluoroethane (HFC-134), 1,1,1-trifluuoroethane (HFC-143a), 1,1-difluoroethane (HFC-152a), parachlorobenzotrifluoride (PCBTF), cyclic, branched, or linear completely methylated siloxanes, acetone, perchloroethylene (tetrachloroethylene), 3,3-dichloro-1,1,1,2,2-pentafluoropropane (HCFC-225ca), 1,3-dichloro-1,1,2,2,3-pentafluoropropane (HCFC-225cb), 1,1,1,2,3,4,4,5,5,5-decafluoropentane (HFC-43-10mee), difluoromethane (HFC-32), ethylfluoride (HFC-161), 1,1,1,3,3,3-hexafluoropropane (HFC-236fa), 1,1,2,2,3-pentafluoropropane (HFC-245ca), 1,1,2,3,3-pentafluoropropane (HFC-245ea), 1,1,1,2,3-pentafluoropropane (HFC-245eb), 1,1,1,3,3-pentafluoropropane (HFC-245fa), 1,1,1,2,3,3-hexafluoropropane (HFC-236ea), 1,1,1,3,3-pentafluorobutane (HFC-365-mfc), chlorofluoromethane (HCFC-31), 1-chloro-1-fluoroethane (HCFC-151a), 1,2-dichloro-1,1,2-trifluoroethane (HCFC-123a), 1,1,1,2,2,3,3,4,4-nonafluoro-4-methoxy-butane ($C_4F_9OCH_3$), 2-(difluoromethoxymethyl)-1,1,1,2,3,3,3-heptafluoropropane (($CF_3$)$_2CFCF_2OCH_3$), 1-ethoxy-1,1,2,2,3,3,4,4,4-nonafluorobutane, and mixtures of any two or more such solvents.

The composition may include one or more stabilizers. In some embodiments, the one or more stabilizers include an antioxidant, a UV absorber, a heat stabilizer, a light stabilizer, or a combination of any two or more such materials. On a weight to weight percent basis, the composition may include one or more stabilizers in an amount of about 0.1 wt % to 99.0 wt %. This may include from about 1.0 wt % to about 10.0 wt %, or from about 10.0 wt % to about 20.0 wt %, or from about 20.0 wt % to about 40.0 wt %, or from about 40.0 wt % to about 60.0 wt %, or from about 60.0 wt % to about 80.0 wt %, or from about 80.0 wt % to about 99.0 wt %, and ranges between any two of these values.

Illustrative antioxidants include 2,6-di-tert-butyl-4-(4,6-bis(octylthio)-1,3,5-triazin-2-ylamino)phenol, N,N'-di-2-butyl-1,4-phenylene-diamine, stearyl-3-(3',5'-di-tert-butyl-4-hydroxyphenyl) propionate, dioctadecyl 3,3'-thiodipropionate, and combinations of any two or more such antioxidants. Illustrative UV absorbers include 2-benzotriazol-2-yl-4,6-bis-(1,1-dimethyl-propyl)-phenol, 2-(4,6-diphenyl-[1,3,5]triazin-2-yl)-phenol, (2-hydroxy-4-octyloxyphenyl)-phenyl-methanone, and combinations of any two or more such UV absorbers. Illustrative light stabilizers include hindered amines such as 2,2,6,6-tetramethyl piperidine, bis (1,2,2,6,6-pentamethyl-4-piperidinyl) sebacate, poly[[6-[(1, 1,3,3,-tetramethylbutyl)amino]-s-triazine-2,4-diyl][2,2,6,6-tetramethyl-4-piperidyl)imino]] hexamethylene[(2,2,6,6-tetramethyl-4-piperidyl)imino]], and combinations of any two or more such light stabilizers. Illustrative heat stabilizers include butyl tin carboxylate, barium zinc, tris(2,4-ditert-butylphenyl) phosphate, and combinations of any two or more such heat stabilizers.

In some embodiments, compositions of the present technology further include at least one filler, at least one additive, or both. In some embodiments, the filler or additive included in the compositions of the present technology is magnesium oxide, calcium oxide, aluminum oxide, manganese oxide, tin oxide, boehmite, dihydrotalcite, hydrocalumite, aluminum hydroxide, magnesium hydroxide, magnesium oxide, magnesium carbonate, calcium carbonate zirconium oxide, molybdenum oxide, bismuth oxide, talc, organoclay, glass fibers, marble dust, cement dust, feldspar, silica, ammonium bromide, antimony trioxide, antimony trioxide, zinc oxide, zinc borate, barium sulfate, silicones, aluminum silicate, calcium silicate, titanium oxide, or mixtures of any two or more such fillers or additives.

In some embodiments, the composition is a fire-retardant. The compositions of the present technology are environmentally friendly and safe compared to the halogen and phosphorous containing fire-retardant compositions. A fire-retardant reduces flammability of fuels or delays their combustion. In one aspect, the fire-retardant compositions of the present technology are substantially halogen-free. In other embodiments, the fire-retardant compositions of the present technology are substantially phosphorous-free. In still other embodiments, the fire-retardant compositions of the present technology are substantially halogen-free and phosphorous-free.

In one aspect, a method of making a fire-retardant composition is provided, wherein the method includes: coating a first reagent with a first encapsulant to form a first encapsulated reagent; coating a second reagent with a second encapsulant to form a second encapsulated reagent; incorporating the first encapsulated reagent and the second encapsulated reagent into a microcapsule. In some embodiments, the method further comprises dispersing a plurality of microcapsules in a polymer matrix to form the fire-retardant composition.

Although coating is mentioned as one of the technique, the first and the second reagent may be encapsulated in the encapsulating materials using other encapsulation techniques known in the art. Exemplary encapsulation methods include, coating, laminating, atomization, spray drying, co-extrusion, freeze drying, co-crystallization, molecular inclusion, injecting the reagents into the void formed by the encapsulating materials, and the like. Similar methods can be used to incorporate the reagents into the microcapsule.

In some embodiments, the method further includes extruding or molding the fire-retardant composition. In some embodiments, the polymer and the fire-retardant compound are combined and placed into a mold and consolidated by applying pressure and shaped into a desired pattern. In some embodiments, the method further includes cooling the extruded or molded composition.

In one aspect, a method of protecting an article from fire is provided, wherein the method includes exposing an article to flame or heat source, and wherein the article includes at least a polymer matrix and a plurality of microcapsules dispersed in the polymer matrix, each microcapsule comprising a first reagent encapsulated with a first encapsulating material and a second reagent encapsulated with a second encapsulating material, and further wherein the first reagent and the second reagent are configured to react with each other endothermically. In some embodiments of the methods, the heat source has a temperature sufficient to breach the first encapsulating material and the second encapsulating material permitting the first reagent to contact the second reagent, and the article exhibits improved fire-resistance, or fire-retardance compared to an article without the first reagent, the second reagent, or both the first reagent and the second reagent.

In some embodiments, the article used in the present methods, displays improved fire and flame-retardant characteristics compared to the same article not comprising the composition. In some embodiments, the article meets the national and local standards, requirements and regulations for fire safety and flame-retardancy.

Without wishing to be bound by theory, it is believed that the FR agents of the present technology work on the principle that certain chemical compounds are known to interact endothermically, i.e., they require heat energy in order to proceed and therefore cool down the surrounding atmosphere considerably. Additionally, the by-products of the combination may be non-combustible compounds which aid in diluting the combustible gas or fuel concentration. The overall flame-retardant effect is thus believed to be based on a combination of endothermic reaction and gas phase dilution mechanisms.

While incorporation of the fire-retardant microcapsules in a polymer matrix is mentioned herein, the microcapsules can be included in any material or article where fire-retardant activity is desired. In some embodiments, the article is coated with the composition. In other embodiments, the article is made from the composition.

Various articles which use fire-retardant compounds are known in the art. Examples of articles include, but are not limited to components for automotive, appliances, electronics, toys, textiles, furniture, carpets, upholstery, mattresses, vehicles, airplanes, sheath, jacket, insulation, cables for electrical or optical transmission, circuit boards, electric motors, coatings, paints, sealants, electronic enclosures, and the like. In some embodiments, the article used in the present methods is an automotive component, an appliance component, a toy, a textile, a carpet, an upholstery, a vehicle component, an airplane component, a computer component, or a housing for an electrical device.

The present technology, thus generally described, will be understood more readily by reference to the following Examples, which are provided by way of illustration and are not intended to be limiting of the present technology.

Examples

Example 1. Synthesis of Test Articles Comprising Flame-Retardant Compositions

Test articles are produced by uniformly mixing suitable amount of microcapsules into a known amount of polymer powder and then this mixture is spread into a uniform layer in a mold. The polymer/fire-retardant microcapsules mixture in the mold is placed onto a press, and covered by a mold cover, and the mixture is consolidated under pressure into a sheet. For polyethylene as the polymer matrix, the molding process is carried out under 7 metric tons pressure. For a comparison study, various fire-retardant reagents which interact endothermically are incorporated into microcapsules which are combined with the same polymer. Control article is prepared using solely the polymer and no additives. Other control articles are prepared using conventional fire-retardants such as decabromodiphenyl ether (decaDBE), along with the same polymer.

Example 2. Testing of Flammability Characteristics

The flammability characteristics of various polymer/flame-retardant microcapsules test articles and control articles prepared using the procedure of Example 1 can be measured and compared. Test procedures can be as given below:

Preliminary Flammability Test Procedure Using a Chemical Exhaust Hood:

Samples of the articles (approximately 125 mm long by approximately 13 mm wide by approximately 3 mm thick) are marked with lines at 25 and 100 mm from the sample end to be ignited. Samples are clamped at the non-marked end, and placed in a chemical exhaust hood, and ignited using a propane torch. Samples are labeled "self extinguishing" if the flame went out and the distance from the sample end to the extinguish point was measured and recorded. If the flame front reaches the 25 mm mark, the time required to reach the 100 mm mark (actual burn distance was 75 mm) is measured and recorded. Mixtures exhibiting 75 mm burn times less than that of pure polyethylene (Control (I)) are judged more flammable while mixtures with times exceeding the Control (I) are considered more flame-retardant.

Flammability Test Procedure Using the UL94 Chamber:

Samples of the articles (approximately 125 mm long by approximately 13 mm wide by approximately 3 mm thick) are marked with lines at 25 and 100 mm from the sample end to be ignited. Sample flammability is measured according to the procedure provided in ASTM D635. The rate of burning and/or extent and time of burning of plastics in a horizontal position is measured.

The flammability of the test articles are measured in both the chemical exhaust hood and UL94 chamber as described above. Because the reagents of the present fire-retardant compositions are configured to react with each other endothermically, they are expected to exhibit a lower rate of burning and improved fire-retardant performance and efficacy compared to control samples. The endothermic reaction is expected to provide substantially reduced temperatures, longer cooling period and improved capability to absorb heat from the article(s) to be treated for fire-retardancy. These compositions are also non-toxic, halogen free, and eco-friendly.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A fire-retardant composition comprising:
  a microcapsule comprising a first reagent encapsulated with a first encapsulating material and a second reagent encapsulated with a second encapsulating material;
  wherein:
    the first reagent is isolated from the second reagent; and
    the first reagent and the second reagent are configured to react with each other endothermically;
  wherein the first encapsulating material comprises a thermally-sensitive material, and
  wherein the thermally-sensitive material comprises an ethylene-vinyl alcohol co-polymer, neoprene, a chlorinated polyethylene, a chlorosulfonated polyethylene, a polyvinylidene chloride, a polyvinylidene chloride-methyl acrylate co-polymer, or a combination of any two or more thereof.

2. The fire-retardant composition of claim 1, wherein the microcapsule comprises a core comprising the first reagent and a shell comprising the second reagent.

3. The fire-retardant composition of claim 1, wherein the second encapsulating material comprises a thermally-sensitive material.

4. The fire-retardant composition of claim 3, wherein the thermally-sensitive material comprises an ethylene-vinyl alcohol co-polymer, neoprene, a chlorinated polyethylene, a chlorosulfonated polyethylene, a polyvinylidene chloride, a polyvinylidene chloride-methyl acrylate co-polymer, or a combination of any two or more thereof.

5. The fire-retardant composition of claim 1, wherein the first encapsulating material and the second encapsulating material are configured to allow the first reagent to contact the second reagent upon heating.

6. The fire-retardant composition of claim 1, wherein the first reagent comprises urea, dimethyl urea, diethylurea, 1,3-dimethyl-1,3-diphenyl urea, 1,1-dimethyl urea, 1,3-dimethyl urea, 1,3-diphenyl urea, 1,3-bis(4-methylphenyl)urea, 1,3-bis(4-methoxyphenyl)urea, 1,3-bis(4-ethoxyphenyl)urea, or a combination of any two or more thereof.

7. The fire-retardant composition of claim 1, wherein the second reagent comprises ammonium chloride, ammonium hypophosphite, ammonium nitrate, ammonium sulfate, ammonium carbonate, ammonium bromide, ammonium iodide, or a combination of any two or more thereof.

8. A fire-retardant composition comprising:
a polymer matrix; and
a plurality of microcapsules dispersed in the polymer matrix, wherein each of the plurality of the microcapsules comprises a first reagent encapsulated with a first encapsulating material and a second reagent encapsulated with a second encapsulating material;
wherein:
the first reagent is isolated from the second reagent; and
the first reagent and the second reagent are configured to react with each other endothermically;
wherein the first encapsulating material comprises a thermally-sensitive material, and
wherein the thermally-sensitive material comprises an ethylene-vinyl alcohol co-polymer, neoprene, a chlorinated polyethylene, a chlorosulfonated polyethylene, a polyvinylidene chloride, a polyvinylidene chloride-methyl acrylate co-polymer, or a combination of any two or more thereof.

9. The fire-retardant composition of claim 8, wherein the polymer matrix comprises a thermoset polymer, a thermoplastic polymer, or a combination of any two or more thereof.

10. The fire-retardant composition of claim 8, wherein the polymer matrix comprises polyethylene, polypropylene, poly(butylene terephthalate), poly(ethylene terephthalate), acrylonitrile-butadiene-styrene, high impact polystyrene, a rubber latex, silicone, nylon, or a combination of any two or more thereof.

11. The fire-retardant composition of claim 8, wherein the polymer matrix comprises high impact polystyrene.

12. The fire-retardant composition of claim 8, wherein the polymer matrix is present in the composition at a concentration of about 5 wt % to about 45 wt %.

13. The fire-retardant composition of claim 8, wherein each of the plurality of microcapsules have an average particle diameter of about 2 µm and about 10 µm.

14. The fire-retardant composition of claim 8, further comprising a filler, an additive, or both a filler and an additive.

15. A process of making a fire-retardant composition, the process comprising:
coating a first reagent with a first encapsulant to form a first encapsulated reagent;
coating a second reagent with a second encapsulant to form a second encapsulated reagent; and
incorporating the first encapsulated reagent and the second encapsulated reagent into a microcapsule;
wherein the first encapsulating material comprises a thermally-sensitive material, wherein the thermally-sensitive material comprises an ethylene-vinyl alcohol co-polymer, neoprene, a chlorinated polyethylene, a chlorosulfonated polyethylene, a polyvinylidene chloride, a polyvinylidene chloride-methyl acrylate co-polymer, or a combination of any two or more thereof.

16. The process of claim 15, further comprising dispersing a plurality of microcapsules in a polymer matrix.

17. The process of claim 15, wherein the fire-retardant composition is in the form of an extruded or molded article.

18. The fire-retardant composition of claim 1, wherein the microcapsule has an average particle diameter of about 1 µm and about 500 µm.

19. The fire-retardant composition of claim 1, wherein the microcapsule has an average particle diameter of about 2 µm and about 10 µm.

20. The fire-retardant composition of claim 8, further comprising an antioxidant, a UV absorber, a heat stabilizer, a light stabilizer, or a combination of any two or more thereof.

* * * * *

UNITED STATES PATENT AND TRADEMARK OFFICE
CERTIFICATE OF CORRECTION

PATENT NO. : 9,856,381 B2
APPLICATION NO. : 14/913239
DATED : January 2, 2018
INVENTOR(S) : Warner et al.

It is certified that error appears in the above-identified patent and that said Letters Patent is hereby corrected as shown below:

On the Title Page

Item (71), delete "EMPIRE TECHNOLOGY DEVELOPMENT LLC, Wilmington (DE)" and insert -- EMPIRE TECHNOLOGY DEVELOPMENT LLC, Wilmington, DE (US) --, therefor.

Item (72), under "Inventors", in Column 1, Line 1, delete "John Warner, Wilmington, MA (US);" and insert -- John Warner, Wilmington, DE (US); --, therefor.

In the Claims

Column 14, Line 30, Claim 1, delete "reagent; and" and insert -- reagent; --, therefor.

Column 14, Line 32, Claim 1, delete "endothermically;" and insert -- endothermically; and --, therefor.

Column 14, Line 33, Claim 1, delete "wherein the first" and insert -- the first --, therefor.

Column 14, Line 34, Claim 1, delete "material, and" and insert -- material, --, therefor.

Column 14, Line 36, Claim 1, delete "neoprene," and insert -- a neoprene, --, therefor.

Column 14, Line 49, Claim 4, delete "neoprene," and insert -- a neoprene, --, therefor.

Column 14, Line 55, Claim 5, delete "to contact" and insert -- to contact with --, therefor.

Column 15, Line 23, Claim 9, delete "combination of any two or more" and insert -- combination --, therefor.

Column 15, Lines 26-29, Claim 10, delete "polyethylene, polypropylene, poly(butylene terephthalate), poly(ethylene terephthalate), acrylonitrile-butadiene-styrene, high impact Signed and Sealed this
Tenth Day of July, 2018

Andrei Iancu
*Director of the United States Patent and Trademark Office*

CERTIFICATE OF CORRECTION (continued)
U.S. Pat. No. 9,856,381 B2 polystyrene, a rubber latex, silicone, nylon," and insert -- a polyethylene, a polypropylene, a poly(butylene terephthalate), a poly(ethylene terephthalate), an acrylonitrile-butadiene-styrene, a high impact polystyrene, a rubber latex, a silicone, a nylon, --, therefor.